(12) United States Patent
Nordlin

(10) Patent No.: US 7,246,976 B2
(45) Date of Patent: Jul. 24, 2007

(54) SPADE BIT

(75) Inventor: William F. Nordlin, Poplar Grove, IL (US)

(73) Assignee: Textron Innovations Inc., Providence, RI (US)

( * ) Notice: Subject to any disclaimer, the term of this patent is extended or adjusted under 35 U.S.C. 154(b) by 274 days.

(21) Appl. No.: 10/962,530

(22) Filed: Oct. 13, 2004

(65) Prior Publication Data

US 2005/0084350 A1    Apr. 21, 2005

Related U.S. Application Data

(60) Provisional application No. 60/513,127, filed on Oct. 21, 2003.

(51) Int. Cl.
*B27G 15/00* (2006.01)

(52) U.S. Cl. ................. 408/225; 408/227

(58) Field of Classification Search .......... 408/211, 408/212, 214, 225, 224, 227, 228
See application file for complete search history.

(56) References Cited

U.S. PATENT DOCUMENTS

| | | | |
|---|---|---|---|
| 2,654,284 A | 10/1953 | Schevenell | |
| 2,684,492 A | 7/1954 | Miner et al. | |
| 2,883,888 A | 4/1959 | Stewart | |
| 3,180,379 A * | 4/1965 | Stewart | 408/211 |
| 4,012,970 A | 3/1977 | Hintz et al. | |
| 4,066,379 A * | 1/1978 | Prohaska | 408/125 |
| 4,115,024 A | 9/1978 | Sussmuth | |
| 4,134,706 A * | 1/1979 | Stewart | 408/213 |
| 4,189,266 A | 2/1980 | Koslow | |
| 4,271,554 A | 6/1981 | Grenell | |
| 5,291,806 A | 3/1994 | Bothum | |
| D376,809 S | 12/1996 | Stone et al. | |
| 5,649,796 A * | 7/1997 | Durney | 408/211 |
| 5,697,738 A | 12/1997 | Stone et al. | |
| 5,700,113 A | 12/1997 | Stone et al. | |

(Continued)

FOREIGN PATENT DOCUMENTS

GB    2130935 A  *  6/1984

(Continued)

OTHER PUBLICATIONS

Greenlee Textron Product Catalog, Copyright 2000, Ten (10) pages.

*Primary Examiner*—Daniel W. Howell
(74) *Attorney, Agent, or Firm*—Trexler, Busnell, Giangiorgi, Blackstone & Marr, Ltd.

(57) ABSTRACT

An embodiment of a spade bit has straight grooves at a lead angle of 4 to 8 degrees placed on flat edges of the spade bit. In an alternative embodiment, a spade bit has two steps of straight grooves at a lead angle of 4 to 8 degrees placed on flat edges of the spade bit. In other alternative embodiments, a spade bit has tapered flat edge which have straight grooves at a lead angle of 4 to 8 degrees placed thereon. The straight grooves on the flat edges of the spade bits allow the spade bit to pull itself through the workpiece with a minimal amount of penetration. The flat edges of the spade bit may also have cutting surfaces for cleaning the hole and permitting the easy removal of the spade bit from the hole after drilling.

37 Claims, 4 Drawing Sheets

U.S. PATENT DOCUMENTS

| | | | |
|---|---|---|---|
| 5,807,039 A * | 9/1998 | Booher et al. | 408/224 |
| 6,354,773 B1 | 3/2002 | Konen | |
| 6,428,250 B2 | 8/2002 | Giebmanns | |
| 6,652,202 B2 * | 11/2003 | Remke et al. | 408/214 |
| 6,957,937 B2 * | 10/2005 | Vasudeva | 408/211 |
| 2001/0010784 A1 | 8/2001 | Giebmanns | |
| 2001/0031178 A1 | 10/2001 | Remke et al. | |
| 2006/0083595 A1 * | 4/2006 | Wiker et al. | 408/225 |

FOREIGN PATENT DOCUMENTS

| | | | |
|---|---|---|---|
| GB | 2271948 A | * | 5/1994 |
| WO | WO 98/05459 | | 2/1998 |

* cited by examiner

SPADE BIT

CROSS-REFERENCE

This patent application claims the benefit of domestic priority of U.S. Provisional Application Ser. No. 60/513,127, filed Oct. 21, 2003, and entitled "Spade Bit".

BACKGROUND OF THE INVENTION

The present invention relates to a spade bit.

Spade bits are generally flat, inexpensive bits having a thickness of generally between $17/200"$ and $19/200"$, which are commonly used in the construction trade for making clearance holes for electrical and plumbing purposes. Spade bits are also commonly used for drilling bolt holes in deck timbers (4×4 and 6×6).

Spade bits, however, have a number of shortcomings. For instance, spade bits require more axial pressure than a twist drill. Also, as the spade bit begins to get dull, the user must apply more pressure to get the bit to cut chips. The axial force requirement also increases as the depth of the hole increases. Further, the flat spade bit has a tendency to vibrate and shake as it works. The high axial force requirement causes much of the vibration to be transmitted to the user. Another shortcoming of the spade bit is that since considerable axial force is applied, there is a potential for mishap when the hole is completed. The operator must brace himself to maintain balance when the hole is completed. It is not uncommon for the user to bust his/her knuckles against the workpiece.

Other tools could be used to overcome the shortcomings of the spade bit, such as wood boring tools like auger bits, but these tools generally sell for five to ten times the amount that a spade bit will sell. Spade bits are different than wood boring tools because the manufacturing of spade bits does not involve any lathe or turning operations. Wood boring tools typically have helical threads or circular grooves thereon for providing improved pull through of the wood boring tool. Such helical threads or circular grooves, however, have not been able to be provided on spade bits for two reasons: (1) the addition of helical threads or circular grooves to a spade bit would represent an unacceptable cost addition to spade bits; and (2) the typical spade bit is generally only $17/200"$ to $19/200"$ thick and, therefore, does not offer the same surface area for threads or grooves as a wood boring bit, which typically have a thickness of $1/4"$ to $3/10"$.

Thus, there is a need for a spade bit which overcomes the foregoing shortcomings. The present invention provides such a spade bit. Other features and advantages of the invention will become apparent in view of the specification and the drawings.

OBJECTS AND SUMMARY OF THE INVENTION

A primary object of the invention is to improve the ease of using an inexpensive spade bit by adding a feature to make it pull through the work piece like an auger bit.

Another primary object of the invention is to provide a self-feeding spade bit which is easy and fast to use.

A further object of the invention is to provide a spade bit which cleans the hole and permits easy removal of the spade bit from the hole after drilling.

Still another object of the invention is to provide a spade bit which does not require more axial pressure than a twist drill.

Another object of the invention is to provide a spade bit which does not require the user to apply more pressure to get the spade bit to cut chips than prior art spade bits.

Yet another object of the invention is to provide a spade bit in which the axial force requirement does not increase as the depth of the hole increases.

Still another object of the invention is to provide a spade bit which reduces the tendency of the spade bit to vibrate and shake as it works, such that the amount of vibration transferred to the user is minimized.

Another object of the invention is to provide a self-feeding spade bit such that an operator need not apply any axial force to complete the hole.

Still another object of the invention is to provide a spade bit which reduces the chance of the operator injuring himself/herself while using the spade bit to create a hole.

Yet another object of the invention is to provide a spade bit which is inexpensive to manufacture.

Briefly, and in accordance with the foregoing, the invention provides a spade bit having straight grooves at a lead angle of 4 to 8 degrees, preferably 6 degrees, placed on flat edges of the spade bit. In an alternative embodiment, a spade bit is provided having two steps of straight grooves at a lead angle of 4 to 8 degrees placed on flat edges of the spade bit. In other alternative embodiments, a spade bit is provided having straight grooves at a lead angle of 4 to 8 degrees placed on flat, tapered edges of the spade bit. The straight grooves on the flat edges of the spade bits allow the spade bit to pull itself through the workpiece with a minimal amount of penetration. The flat edges of the spade bit may also have cutting surfaces for cleaning the hole and permitting the easy removal of the spade bit from the hole after drilling.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
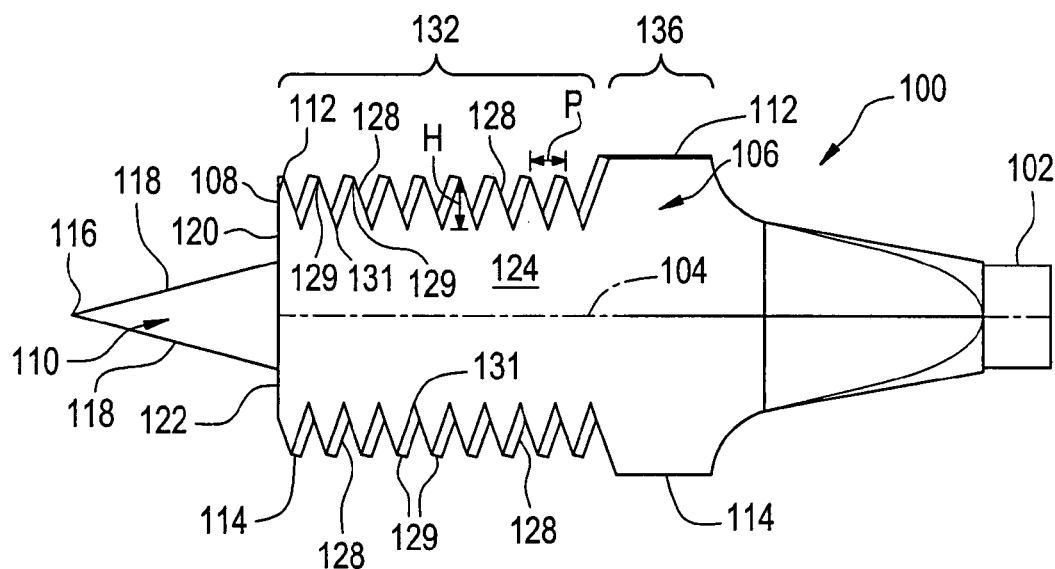
FIG. 1 is a top plan view of a spade bit of a first embodiment of the present invention.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Figure 2:
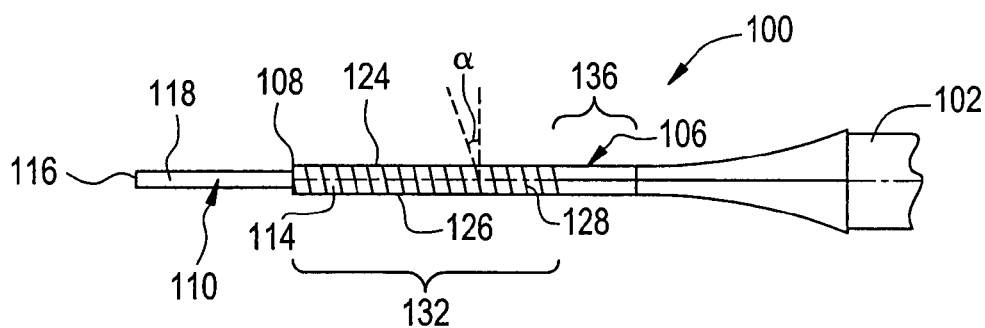
FIG. 2 is a side elevational view of the spade bit of the first embodiment of the present invention.
Figure 3:
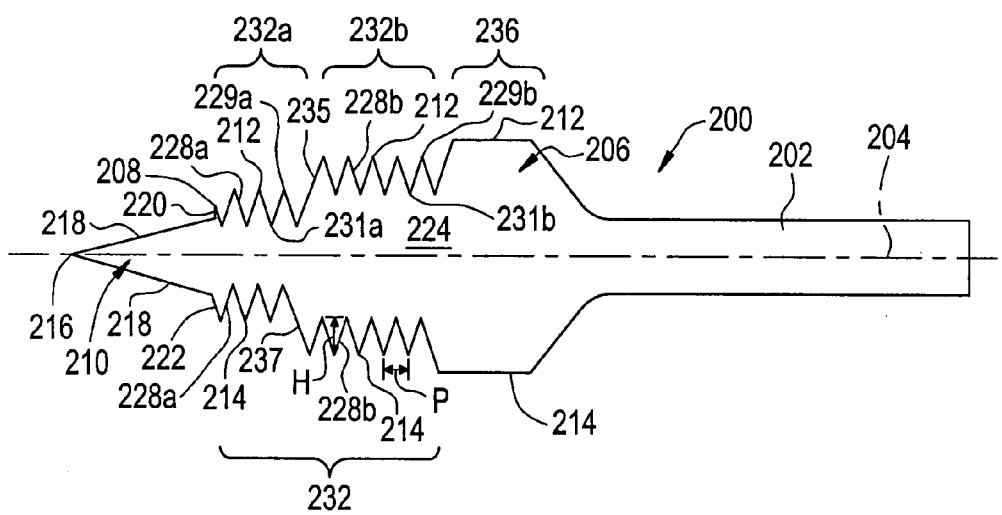
FIG. 3 is a top plan view of a spade bit of a second embodiment of the present invention.
Figure 4:
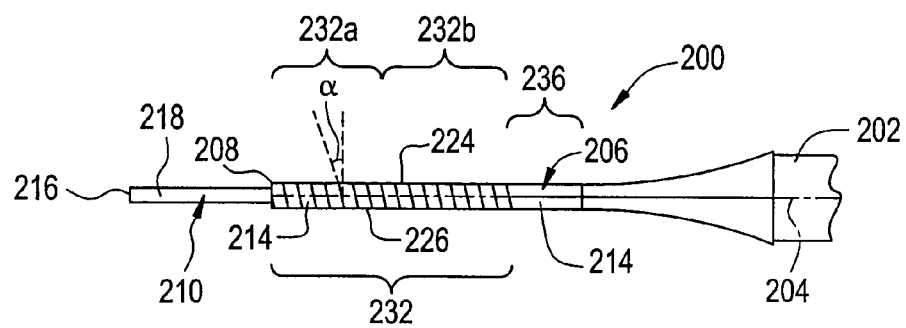
FIG. 4 is a side elevational view of the spade bit of the second embodiment of the present invention.
Figure 5:
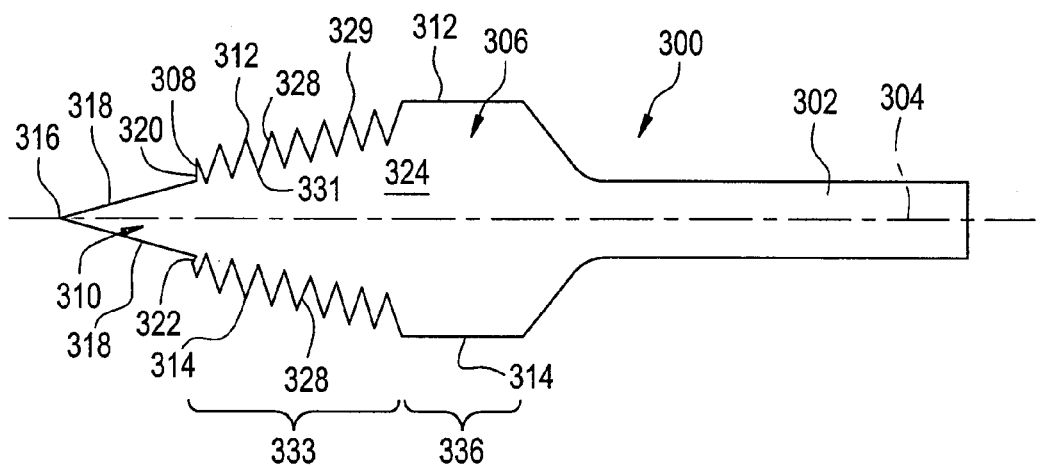
FIG. 5 is a top plan view of a spade bit of a third embodiment of the present invention.
Figure 6:
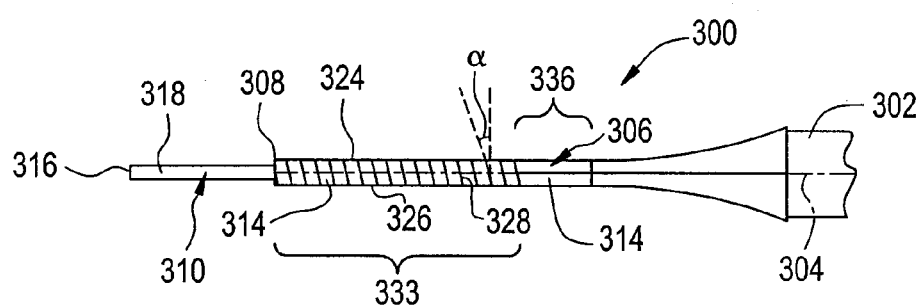
FIG. 6 is a side elevational view of the spade bit of the third embodiment of the present invention.
Figure 7:
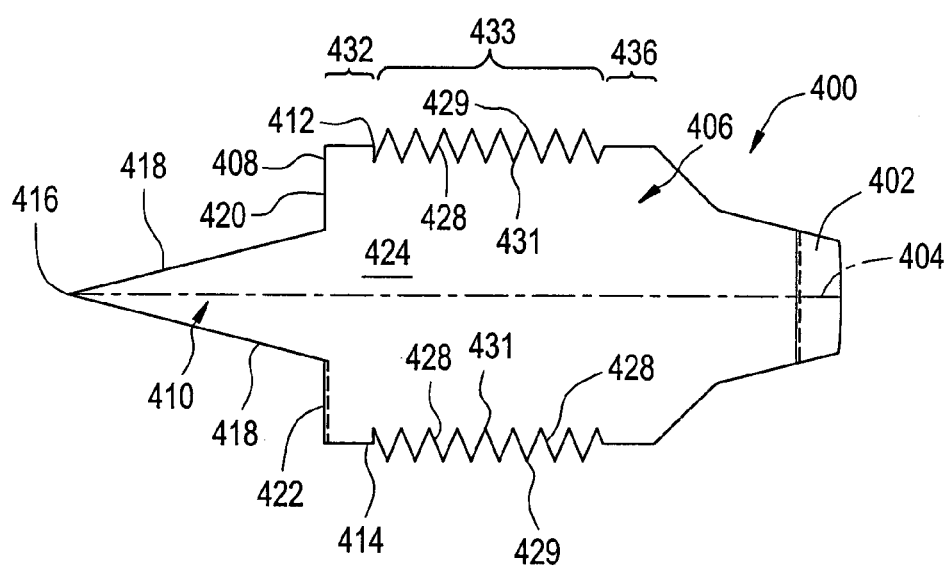
FIG. 7 is a top plan view of a spade bit of a fourth embodiment of the present invention.
Figure 8:
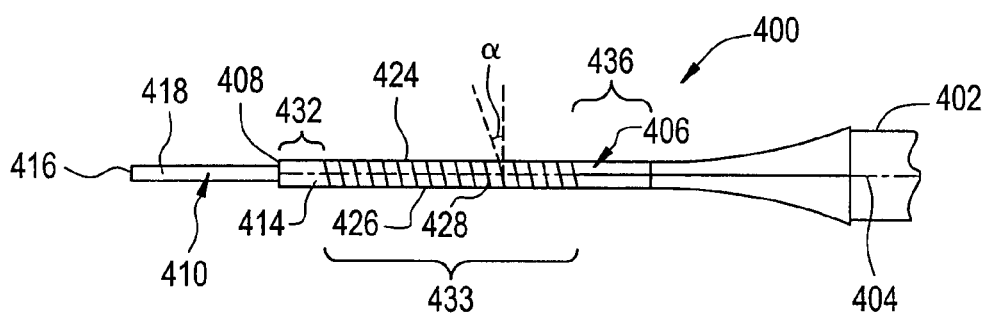
FIG. 8 is a side elevational view of the spade bit of the fourth embodiment of the present invention.

A first embodiment of a spade bit 100 which incorporates features of the invention is shown in FIGS. 1 and 2 with reference numerals being in the one hundreds. A second embodiment of a spade bit 200 which incorporates features of the invention is shown in FIGS. 3 and 4 with reference numerals being in the two hundreds. A third embodiment of a spade bit 300 which incorporates features of the invention is shown in FIGS. 5 and 6 with reference numerals being in the three hundreds. A fourth embodiment of a spade bit 400 which incorporates features of the invention is shown in FIGS. 7 and 8 with reference numerals being in the four hundreds. The spade bit 100, 200, 300, 400 is used to form a hole in a workpiece (not shown) by drilling.

Attention is invited to FIGS. 1 and 2. The spade bit 100 includes an elongated shaft 102 which defines a longitudinal axis 104. A generally flat, generally rectangular blade portion 106 is joined to a forward end of the shaft 102. A rear end (not shown) of the shaft 102, opposite the forward end, is received and held by a drill (not shown) during drilling operations.

A forward end 108 of the blade portion 106, opposite the forward end of the shaft 102, has a spur 110 which extends therefrom. The spur 110 is provided equidistant between a first side edge 112 of the blade portion 106 and a second side edge 114 of the blade portion 106. The first and second side edges 112, 114 are generally parallel to one another. The spur 110 is used to center and to guide the spade bit 100 during drilling operations. The spur 110 is generally of a triangular or pyramidal configuration such that it comes to a point 116. The spur 110 also includes cutting edges 118 for removing wood or other material when the spade bit 100 is rotated in a predetermined direction of rotation during drilling operations. In particular, the spur cutting edges 118 extend along opposed sides of the base of the spur 110 at the forward end 108 to the forwardmost portion of the spur 110, i.e., the spur point 116.

A cutting edge 120 is formed on the forward end 108 between the spur 110 and the first side edge 112. The cutting edge 120 is generally perpendicular to the first side edge 112. A cutting edge 122 is formed on the forward end 108 between the spur 110 and the second side edge 114. The cutting edge 120 is generally perpendicular to the second side edge 114. The cutting edges 120, 122 of the spade bit 100 are the leading surfaces of the blade portion 106 and function to enlarge the hole of the workpiece.

The first side edge 112 and the second side edge 114 extend between a first face 124 of the blade portion 106 and a second face 126 of the blade portion 106 to define a thickness of the blade portion 106. The first and second faces 124, 126 are parallel to one another and are generally approximately between 17/200" and 19/200" apart from one another, such that the blade portion 106 is generally approximately between 17/200" and 19/200" thick. Preferably, the blade portion 106 is approximately 3/32" thick. As a result, the spade bit 100 is much thinner than other wood boring bits which typically have a thickness of between 1/4" to 3/10".

A diameter of the blade portion 106 is defined by the distance between the first side edge 112 and the second side edge 114. The first and second faces 124, 126 have two separate portions 132, 136 provided thereon such that the blade portion 106 has two different diameters, with the portion 136 having the larger diameter of the two portions 132, 136. The portion 136 can have varying diameters depending on the size of hole to be drilled in the workpiece, but should have a diameter which is larger than a diameter of the first portion 132.

A forward end of the first portion 132 is provided at the forward end 108 such that it extends from the spur 110. The first portion 132 is provided with grooves 128 which have been ground into the edges 112, 114 such that the first portion 132 is a grooved portion of the blade portion 106. Each groove 128 is defined by a pair of adjacent crests 129 and a root 131 provided therebetween. Each groove 128 is a straight groove, as opposed to a circular or helical groove, because the side edges 112, 114 of the first portion 132 are linear, rather than curved, between the crests 129 and the root 131. The straight grooves 128 are ground into the edges at a lead angle α, see FIG. 2, wherein the lead angle α is preferably between 4 and 8 degrees, with a preferred lead angle α of 6 degrees.

The preferred lead angle α of between 4 and 8 degrees was determined after a number of tests. As explained, there are many types of wood boring tools which have threads on the outer diameters thereof. Each of these tools, though, are relatively massive with a thick cross-section of approximately 1/4" to 3/10", whereas typical commercial spade bits typically have a cross-section in the range of approximately 17/200" to 19/200" thick, and preferably have a cross-section of approximately 3/32" thick. Thus, because of the relatively small cross-section of spade bits, it was previously believed in the industry, that grooves or threads on the edges of the spade bit would not work because there was not enough cross-section. Applicant is not aware of any prior art spade bits which have grooves or threads of any kind on the edges thereof.

In a first test, a standard spade bit was used to drill a hole in a 2" by 4" wood workpiece and the chip thickness was measured at approximately 1/32" to 1/16". A 1/16" pitch on a 7/8" diameter spade bit is equal to a lead angle of 1.25 degrees. For a 3/32" thick spade bit blade, a thread would advance just 0.004".

In a second test, straight grooves were ground on the 3/32" thick edges of the spade bit blade. Because the 1.25 degree lead angle would only produce an advance of 0.004", it was decided to grind the grooves at a 5 degree angle. A 5 degree lead angle produced an advance of nearly 1/4" per revolution. It was assumed that a chip thickness of 1/4" would stall the spade bit, but the spade bit was tried anyway. It was found that the spade bit drilled like a standard spade bit until the spade bit had penetrated the work piece approximately 3/4". Then there was noticeably less operator force needed to complete the hole.

In a third test, a spade bit was made using a 2 degree angle. The spade bit, using the 2 degree angle, did not produce any noticeable self-feeding characteristics.

In a fourth test, the angle of the groove was increased from 5 degrees to 8 degrees. This spade bit drilled like a commercial spade bit until the blade portion of the spade bit had penetrated the work piece approximately 3/4" and then it pulled itself strongly through the remainder of the 2" by 4" workpiece.

Thus, prior to the present invention, it was not obvious to one of ordinary skill in the art that adding grooves to a 3/32" thick spade bit would provide sufficient traction to pull the spade bit through the workpiece. For a 7/8" diameter spade bit, a lead angle of 1-2 degrees should produce a chip thickness of 1/16" according to the following formula:

$$\theta = \tan^{-1}(\text{Pitch}/(\pi D))$$

$\theta$ = The lead angle

Pitch = The distance between 2 turns of the lead angle (chip thickness)

$\pi D$ = The circumference of the diameter

But, 1-2 degree grooves on the thin edges of the spade bit did not feed the bit through the wood. A 5 degree lead angle produced significant pull, but 8 degrees caused the bit to pull itself through the wood. According to the aforementioned formula, an 8 degree groove lead angle on a 7/8" diameter bit mathematically should produce a chip thickness of 3/8". Thus, the obvious 1-2 degree design does not work, but the 8 degree solution that does work is not readily explained by the mathematical formula. The reason for this is as follows. A 2 degree lead angle on the grooves does not work because the spade bit thickness is typically 3/32" thick. If the lead angle is 2 degrees, then the numerical measure of the lead over the thickness of the blade is (3/32") tan (2 degrees) =0.003 inches. Due to the flexible nature of wood, the wood fibers simply flex 0.003 inches and this shallow lead angle does not cause the spade bit to advance through the wood. An 8 degree angle does work because the spade bit thickness is typically 3/32" thick. If the lead angle is 8 degrees, then the numerical measure of the lead over the thickness of the blade is (3/32") tan (8 degrees)=0.013 inches. The wood is not able to deflect 0.013 inches and so the spade bit pulls itself through the wood. An 8 degree lead angle on a 7/8" diameter spade bit should produce a chip thickness of 3/8" which would certainly stall a motor of a drill driving the spade bit. The reason that it works is because the grooves 128 on the outer diameter of the spade bit 100 are not "tracking" like railroad cars on a train track. Rather, they are pulling and "skidding" or "slipping" like a race car going around a race track. Another analogy would be downhill skiing. In order to turn on downhill skis, the skis are turned to a greater angle than the desired path because the snow will compact or be thrown to the side, thus reducing the "effective" angle of the turn. Thus, it is now understood that the placing of the grooves 128 on the spade bit 100 provides unexpected results as well as provides a basis for why prior art spade bits do not have grooves provided thereon.

For a spade bit 100 which has a diameter of 7/8", the height H of the grooves 128 is preferably 0.14 inches and the grooves 128 generally do not extend to the cutting edges 120, 122. The height H of the grooves 128 is defined as the distance from one root 131 to a midpoint of a straight line connecting the two crests 129 which are adjacent to the one root 131. The pitch P of the grooves is preferably 0.10". The pitch P of the grooves 128 is defined as the distance from one crest 129 to an adjacent crest 129.

Thus, the straight grooves 128 provided on the first and second edges 112, 114 of the spade bit 100 provide benefits to the spade bit 100 in comparison to a standard spade bit which does not have the straight grooves provided on its edges. Namely, the spade bit 100 pulls through the workpiece more easily such that the operator need only apply minimal, if any, axial force in order to complete the hole. Because the operator no longer has to lean into the workpiece to make the drill work, there is less tendency for the operator to hit/bust his knuckles on the work piece when the drill breaks through. As the spade bit 100 is self-feeding, it is much easier and faster to use than standard spade bits. The spade bit 100 also provides many of the benefits of a wood boring tool, but the cost of the spade bit 100 is still commensurate with a standard spade bit.

The second portion 136 is provided at a rear end of the first portion 132 such that it extends between the first portion 132 and the shaft 102. The side edges 112, 114 of the second portion 136 are not ground to have grooves formed therein, but rather are sharpened such that the side edges 112, 114 of the second portion 136 act as cutting edges. The second portion 136 has a diameter from the first side edge 112 to the second side edge 114 of 0.875", as the spade bit 100 is a 7/8" diameter spade bit. The diameter of the second portion 136 is larger than the diameter of the first portion 132.

The second portion 136 is provided in order to improve the ease of removing the spade bit 100 from the workpiece after drilling the hole relative to a standard spade bit. While making the spade bit 100 pull itself was the primary goal of the tests, early prototype spade bits required significant force to remove them from the workpiece after drilling because the hole was rough and the feeding grooves interfered with the inner diameter of the hole. The spade bit 100 could be easily removed if the electric drill motor were reversed, but this added user operation was undesirable. Also, the spade bit 100 produced a hole with stringy wood fibers from the scraping, slipping and cutting by the grooves 128. Thus, the first and second side edges 112, 114 of the second portion 136 were sharpened to act as cutting edges in order to enlarge the wall of the hole and to clean and smooth the hole by removing these stringy wood fibers from the wall of the hole.

Attention is invited to the second embodiment of the spade bit 200 which is illustrated in FIGS. 3 and 4. The second embodiment of the spade bit 200 was derived as an improvement over the first embodiment of the spade bit 100. While the self-feeding of the spade bit 100 was adequate, it was desired to make the spade bit feed itself with less engagement in the workpiece.

The spade bit 200 includes an elongated shaft 202 which defines a longitudinal axis 204. A generally flat blade portion 206 is joined to a forward end of the shaft 202. A rear end (not shown) of the shaft 202, opposite the forward end, is received and held by a drill (not shown) during drilling operations.

A forward end 208 of the blade portion 206, opposite the forward end of the shaft 202, has a spur 210 which extends therefrom. The spur 210 is provided between a first side edge 212 of the blade portion 206 and a second side edge 214 of the blade portion 206. The first side edge 212 is generally parallel to the second side edge 214. The spur 210 is used to center and to guide the spade bit 200 during drilling operations. The spur 210 is generally of a triangular or pyramidal configuration such that it comes to a point 216. The spur 210 also includes cutting edges 218 for removing wood or other material when the spade bit 200 is rotated in a predetermined direction of rotation during drilling operations. In particular, the spur cutting edges 218 extend along opposed sides of the base of the spur 210 at the forward end 208 to the forward-most portion of the spur 210, i.e., the spur point 216.

The first side edge 212 and the second side edge 214 extend between a first face 224 of the blade portion 206 and a second face 226 of the blade portion 206 to define a thickness of the blade portion 206. The first and second faces 224, 226 are parallel to one another and are generally approximately between 17/200" and 19/200" apart from one another, such that the blade portion 206 is generally between approximately 17/200" and 19/200" thick. Preferably, the blade portion 206 is approximately 3/32" thick. As a result, the spade bit 200 is much thinner than other wood boring bits which typically have a thickness of between 1/4" to 3/10".

A diameter of the blade portion 206 is defined by the distance between the first side edge 212 and the second side edge 214. The first and second faces 224, 226 have two separate portions 232, 236 provided thereon. The first portion 232 is divided into two separate sections 232a, 232b such that the blade portion 206 has three different diameters, with the portion 236 having the larger diameter over the first and second sections 232a, 232b of the first portion 232. The portion 236 can have varying diameters depending on the size of hole to be drilled in the workpiece, but should have a diameter which is larger than a diameter of the first and second sections 232a, 232b of the first portion 232.

A forward end of the first section 232a of the first portion 232 is provided at the forward end 208 such that it extends from the spur 210. The first section 232a of the first portion 232 is provided with grooves 228a which have been ground onto the edges 212, 214. Each groove 228a is defined by a pair of adjacent crests 229a and a root 231a provided therebetween. Each groove 228a is a straight groove, as opposed to a circular or helical groove, because the side edges 212, 214 of the first section 232a of the first portion 232 are linear, rather than curved, between the crests 229a and the root 231a. The straight grooves 228a are ground into the side edges 212, 214 at a lead angle $\alpha$, see FIG. 4, wherein the lead angle $\alpha$ is preferably between 4 and 8 degrees, with a preferred lead angle $\alpha$ of 6 degrees.

A cutting edge 220 may be formed on the forward end 208 of the blade portion 206 between the spur 210 and the first side edge 212 of the blade portion 206. A cutting edge 222 may be formed on the forward end 208 of the blade portion 206 between the spur 210 and the second side edge 214 of the blade portion 206. The cutting edges 220, 222 of the spade bit 200 are the leading surfaces of the first section 232a of the first portion 232 and function to enlarge the hole of the workpiece.

For a spade bit 200 which has a diameter of 7/8", the height H of the grooves 228a is preferably 0.1375" such that the first section 232a of the first portion 232 has an outer diameter from first edge 212 to second edge 214 of 0.5". The height H of the grooves 228a is defined as the distance from one root 231a to a midpoint of a straight line connecting the two crests 229a which are adjacent to the one root 231a. The pitch P of the grooves 228a is preferably 0.10". The pitch P of the grooves 228a is defined as the distance from one crest 229a to an adjacent crest 229a.

A forward end of the second section 232b of the first portion 232 is provided at a rear end of the first section 232a of the first portion 232 such that it extends from the first section 232a of the first portion 232. The second section 232b of the first portion 232 is provided with grooves 228b which have been ground onto the edges 212, 214. Each groove 228b is defined by a pair of adjacent crests 229b and a root 231b provided therebetween. Each groove 228b is a straight groove, as opposed to a circular or helical groove, because the side edges 212, 214 of the second section 232b of the first portion 232 are linear, rather than curved, between the crests 229b and the root 231b. The straight grooves 228b are ground into the edges at a lead angle $\alpha$, wherein the lead angle $\alpha$ is preferably between 4 and 8 degrees, with a preferred lead angle $\alpha$ of 6 degrees.

A cutting edge 235 is formed on the first side edge 212 of the blade portion 206 and connects the first section 232a of the first portion 232 to the second section 232b of the first portion 232. A cutting edge 237 is formed on the second side edge 214 of the blade portion 206 and connects the first section 232a of the first portion 232 to the second section 232b of the first portion 232. The cutting edges 235, 237 of the spade bit 200 are the leading surfaces of the second section 232b of the first portion 232 and function to enlarge the hole of the workpiece.

The grooves 228a of the first section 232a of the first portion 232 provide more pulling with less resistive torque. The smaller diameter of the first section 232a of the first portion 232 requires less engagement with the workpiece when the spade bit 200 begins pulling itself through.

As both the first section 232a of the first portion 232 and the second section 232b of the first portion 232 have grooves 228a, 228b formed along the side edges 212, 214 thereof, the first portion 232 is a grooved portion of the blade portion 206.

For a spade bit 200 which has a diameter of 7/8", the height H of the grooves 228b is preferably 0.1375" such that the second section 232b of the first portion 232 has an outer diameter from first edge 212 to second edge 214 of 0.75". The height H of the grooves 228b is defined as the distance from one root 231b to a midpoint of a straight line connecting the two crests 229b which are adjacent to the one root 231b. The pitch P of the grooves 228b is preferably 0.10". The pitch P of the grooves 228b is defined as the distance from one crest 229b to an adjacent crest 229b.

A forward end of the second portion 236 is provided at a rear end of the second section 232b of the first portion 232 such that it extends from the second section 232b of the first portion 232. The edges 212, 214 of the second portion 236 are not ground to have grooves formed therein, but rather are sharpened such that the edges 212, 214 of the second portion 236 act as cutting edges. The second portion 236 has an outer diameter from first edge 212 to second edge 214 of 0.875", as the spade bit 200 is a 7/8" diameter spade bit. The first edge 212 preferably extends a length of 0.322" while the second edge 214 preferably extends a length of 0.372, the difference between the two lengths being accounted for by half of the pitch of the grooves 228a, 228b.

As explained, the second embodiment of the spade bit 200 was derived as an improvement over the first embodiment of the spade bit 100 because it was desired to make the spade bit feed itself with less engagement in the workpiece. Thus, in a fifth test, two steps of grooves (which resulted in 232a and 232b) were placed on each edge 212, 214 of the spade bit 200. The smaller steps caused the self-feeding feature to engage with only about 1/4" of the blade portion 206 penetrating the workpiece. The grooves 228b on the larger step 232b helped feed the spade bit through the workpiece. The prototype in the fifth test was very adequate except for the difficulty in removing the spade bit from the workpiece.

In a sixth test, to improve the ease of removing the spade bit from the workpiece after drilling the hole, the two step spade bit 200 was slightly modified such that straight cutting portions were provided at the rear of the blade portion 206 which have larger outer diameters than the two steps of grooves 228a, 228b, similar to the straight cutting portions provided at the rear of the blade portion 106. While making the spade bit 200 pull itself was the primary goal of the tests, early prototype spade bits required significant force to remove them from the workpiece after drilling because the hole was rough and the feeding grooves 228a, 228b interfered with the inner diameter of the hole. The spade bit 200 could be easily removed if the electric drill motor were reversed, but this added user operation was undesirable. Thus, as in the first embodiment of the spade bit 100, the side edges 212, 214 of the second portion 236 were sharpened to act as cutting edges in order to enlarge the hole and smooth the wall of the hole. The second embodiment of the spade bit 200 is thus the result of the sixth test.

The spade bit 200 provides the same advantages over the standard spade bit as does the spade bit 100 of the first embodiment, but further provides the advantages of having the spade bit 200 feed itself with less engagement of the blade portion 206 with the work piece, i.e., ¼" as opposed to ¾". Further, the spade bit 200 has a distinct step in the first portion 232 of the blade portion 206 as the grooves 228a are provided on the first section 232a of the first portion 232 which has a diameter which is smaller than a diameter of the second section 232b of the first portion 232, where the grooves 228b are provided. As the first section 232a of the first portion 232 has a smaller diameter, the grooves 228a are able to provide more pulling with less resistive torque. The first section 232a of the first portion 232 requires less engagement with the workpiece before the spade bit 200 begins pulling itself through.

The second portion 236 is again provided in order to improve the ease of removing the spade bit 200 from the workpiece after drilling the hole relative to a standard spade bit. Also, as the spade bit 200 will produce a hole with stringy wood fibers from the scraping, slipping and cutting by the grooves 228a, 228b, the cutting surfaces were added to the second portion 236 to enlarge the hole and to clean and smooth the wall of the hole by removing these stringy wood fibers from the wall of the hole.

Attention is invited to the third embodiment of the spade bit 300 which is illustrated in FIGS. 5 and 6. The third embodiment of the spade bit 300 was derived as an improvement over the second embodiment of the spade bit 200. The spade bit 200 while highly effective, did not offer as simple a tooling solution for various diameters of spade bits as desired.

The spade bit 300 includes an elongated shaft 302 which defines a longitudinal axis 304. A generally flat blade portion 306 is joined to a forward end of the shaft 302. A rear end of the shaft 302, opposite the forward end, is received and held by a drill (not shown) during drilling operations.

A forward end 308 of the blade portion 306, opposite the forward end of the shaft 302, has a spur 310 which extends therefrom. The spur 310 is provided between a first side edge 312 of the blade portion 306 and a second side edge 314 of the blade portion 306. The spur 310 is used to center and to guide the spade bit 300 during drilling operations. The spur 310 is generally of a triangular or pyramidal configuration such that it comes to a point 316. The spur 310 also includes cutting edges 318 for removing wood or other material when the spade bit 300 is rotated in a predetermined direction of rotation during drilling operations. In particular, the spur cutting edges 318 extend along opposed sides of the base of the spur 310 at the forward end 308 to the forwardmost portion of the spur 310, i.e., the spur point 316.

The first side edge 312 and the second side edge 314 extend between a first face 324 of the blade portion 306 and a second face 326 of the blade portion 306. The first and second faces 324, 326 are parallel to one another and are typically approximately ¹⁷⁄₂₀₀" to ¹⁹⁄₂₀₀" apart from one another such that the blade portion 306 is approximately between ¹⁷⁄₂₀₀" and ¹⁹⁄₂₀₀" thick. Preferably, the blade portion 306 is approximately ³⁄₃₂" thick. As a result, the spade bit 300 is much thinner than other wood boring bits which typically have a thickness of between ¼" to ³⁄₁₀".

A diameter of the blade portion 306 is defined by the distance between the first side edge 312 and the second side edge 314. The first and second faces 324, 326 also have two separate portions 333, 336 provided thereon. The portion 336 can have varying diameters depending on the size of the hole to be drilled in the workpiece, but should have a diameter which is larger than a diameter of the first portion 333.

A forward end of the first portion 333 is provided at the forward end 308 such that it extends from the spur 310. The first portion 333 is provided with grooves 328 which have been ground into the side edges 312, 314 such that the first portion 333 is a grooved portion of the blade portion 306. Each groove 328 is defined by a pair of adjacent crests 329 and a root 331 provided therebetween. Each groove 328 is a straight groove, as opposed to a circular or helical groove, because the side edges 312, 314 of the first portion 333 are linear, rather than curved, between the crests 329 and the root 331. The straight grooves 328 are ground into the edges 312, 314 at a lead angle α, see FIG. 6, wherein the lead angle α is preferably between 4 and 8 degrees, with a preferred lead angle α of 6 degrees. A cutting edge 320 may be formed on the forward end 308 of the blade portion 306 between the spur 310 and the first side edge 312. A cutting edge 322 may be formed on the forward end 308 of the blade portion 306 between the spur 310 and the second side edge 314. The cutting edges 320, 322 of the spade bit 300 are the leading surfaces of the blade portion 306 and function to enlarge the hole of the workpiece.

The side edges 312, 314 of the first portion 333 are tapered such that the forward end of the first portion 333 has a diameter which is smaller than a rear end of the first portion 333.

A forward end of the second portion 336 is provided at the rear end of the first portion 333 such that it extends from the first portion 333. The side edges 312, 314 of the second portion 336 are not ground to have grooves formed therein, but rather are sharpened such that the side edges 312, 314 of the second portion 336 act as cutting edges. The second portion 336 has an outer diameter from first edge 312 to second edge 314 of 0.875", as the spade bit 300 is a ⅞" diameter spade bit. The first edge 312 preferably extends a length of 0.48" while the second edge 314 preferably extends a length of 0.52".

As explained, the third embodiment of the spade bit 300 was derived as an improvement over the second embodiment of the spade bit 200 because the spade bit 200 did not offer a simple tooling solution for various diameters of spade bits. Thus, in a seventh test, a "V" shaped spade bit with grooves of increasing height along both edges was made and, upon use, not only began pulling with minimal wood penetration, but offered a simple tooling solution for various diameters of spade bits over the two step design of the spade bit 200 from the sixth test. A single grinding wheel can produce the teeth/grooves as well as the cutting edges at the rear of the bit. The third embodiment of the spade bit 300 is thus the result of the seventh test.

The reason the "V" is an improvement goes back to the formula for the lead angle α. It has been found that the lead angle of less than 2 degrees (based on chip thickness) does not pull the bit through the wood. The lead angle of 4-8 degrees works well but mathematically should generate a chip of up to ⅜" thick. The chips from the prototype bits are thin at 0.03 or less. Based on the revolutions per minute (RPM) of the drill motor and the time it takes to drill a hole, it is clear that the grooves on the bit are not threading the hole like a screw or tap would. Rather, the grooves are steering the bit through the wood like a skier or ice skater. The angle at which a skier tips the skis is much greater than the course correction desired because the skis "plow"

through the snow. The grooves on the spade bit are simply scraping on the inner diameter of the hole like an ice skate scraping on the ice. Referring to FIG. 5, since the grooves 328 are scraping wood out of the hole to pull the spade bit 300 through, it makes sense that the tapered groove pattern in FIG. 5 would allow each successive tooth/groove to have some "new" wood to scrape or chew on.

The second portion 336 is again provided in order to improve the ease of removing the spade bit 300 from the workpiece after drilling the hole relative to a standard spade bit. Also, as the spade bit 300 will produce a hole with stringy wood fibers from the scraping, slipping and cutting by the grooves 328, the cutting surfaces were added to the second portion 336 to enlarge the hole and to clean and smooth the hole by removing these stringy wood fibers from the hole.

The spade bit 300 provides the same advantages over the standard spade bit and the spade bit 100 as does the spade bit 200, but further provides the advantages of offering a simple tooling solution for various diameters of spade bits over the spade bit 200.

Attention is invited to the fourth embodiment of the spade bit 400 is illustrated in FIGS. 7-8. The spade bit 400 includes an elongated shaft 402 which defines a longitudinal axis 404. A generally flat blade portion 406 is joined to a forward end of the shaft 402. A rear end of the shaft 402, opposite the forward end, is received and held by a drill (not shown) during drilling operations.

A forward end 408 of the blade portion 406, opposite the forward end of the shaft 402, has a spur 410 which extends therefrom. The spur 410 is provided equidistant between a first side edge 412 of the blade portion 406 and a second side edge 414 of the blade portion 406. The spur 410 is used to center and to guide the spade bit 400 during drilling operations. The spur 410 is generally of a triangular or pyramidal configuration such that it comes to a point 416. The spur 410 also includes cutting edges 418 for removing wood or other material when the spade bit 400 is rotated in a predetermined direction of rotation during drilling operations. In particular, the spur cutting edges 418 extend along opposed sides of the base of the spur 410 at the forward end 408 to the forward-most portion of the spur 410, i.e., the spur point 416.

A cutting edge 420 is formed on the forward end 408 between the spur 410 and the first side edge 412. A cutting edge 422 is formed on the forward end 408 between the spur 410 and the second side edge 414. The cutting edges 420, 422 of the spade bit 400 are the leading surfaces of the blade portion 406 and function to enlarge the hole of the workpiece. The cutting edges 420, 422 may be parallel to one another, but offset from one another, if desired, as illustrated in FIG. 7.

The first side edge 412 and the second side edge 414 extend between a first face 424 of the blade portion 406 and a second face 426 of the blade portion 406. The first and second faces 424, 426 are parallel to one another and are generally approximately between $17/200"$ and $19/200"$ apart from one another, such that the blade portion 406 is generally approximately between $17/200"$ and $19/200"$ thick. Preferably, the blade portion 406 is approximately $3/32"$ thick. As a result, the spade bit 400 is much thinner than other wood boring bits which typically have a thickness of between $1/4"$ to $3/10"$.

A diameter of the blade portion 406 is defined by the distance between the first side edge 412 and the second side edge 414. The first and second faces 424, 426 also have three separate portions 432, 433, 436 provided thereon such that the blade portion 406 has different diameters along a length thereof, with the portion 436 having the largest diameter of the three portions 432, 433, 436. The portion 436 can have varying diameters depending on the size of the hole to be drilled in the workpiece, but should have a diameter which is larger than a diameter of either the first portion 432 or the second portion 433.

A forward end of the first portion 432 is provided at the forward end 408, of which the cutting portions 420, 422 are a part thereof, such that the first portion 432 extends from the spur 410. The side edges 412, 414 of the first portion 432 may be sharpened, if desired, such that the side edges 412, 414 of the first portion 432 act as cutting edges. The first portion 432 has a generally constant outer diameter from the side edge 412 to the side edge 414.

A forward end of the second portion 433 is provided at a rear end of the first portion 432 such that it extends from the first portion 432. The second portion 433 is provided with grooves 428 which have been ground into the side edges 412, 414 such that the second portion 433 is a grooved portion of the blade portion 406. Each groove 428 is defined by a pair of adjacent crests 429 and a root 431 provided therebetween. Each groove 428 is a straight groove, as opposed to a circular or helical groove, because the side edges 412, 414 of the second portion 433 are linear between the crests 429 and the root 431. The straight grooves 428 are ground into the side edges 412, 414 at a lead angle α, see FIG. 8, wherein the lead angle α is preferably between 4 and 8 degrees, with a preferred lead angle α of 6 degrees.

The first portion 432 extends between the side edge 412 and the side edge 414. The side edge 412 and the side edge 414 are generally parallel to one another. The side edge 412 is generally positioned at or between the crest 429 and the root 431 of the groove 428 most proximate to the first portion 432. The side edge 414 is generally positioned at or between the crest 429 and the root 431 of the groove 428 most proximate to the first portion 432. Thus, the first portion 432 has a diameter which is less than or equal to the crest diameter, but greater than or equal to the root diameter, wherein the crest diameter is defined as a distance between the crest 429 of the groove 428 of the edge 412 which is most proximate to the first portion 432 and the crest 429 of the groove 428 of the edge 414 which is most proximate to the first portion 432, and where the root diameter is defined as a distance between the root 431 of the groove 428 of the edge 412 which is most proximate to the first portion 432 and the root 431 of the groove 428 of the edge 414 which is most proximate to the first portion 432.

The edges 412, 414 of the second portion 433 are tapered such that the forward end of the second portion 433 has a diameter which is smaller than a rear end of the second portion 433.

A forward end of the third portion 436 is provided at the rear end of the second portion 433 such that it extends from the second portion 433. The side edges 412, 414 of the third portion 436 are not ground to have grooves formed therein, but rather are sharpened such that the side edges 412, 414 of the third portion 436 act as cutting edges. The third portion 436 has an outer diameter from the first side edge 412 to the second side edge 414 which is equivalent to the set and advertised diameter of the spade bit 400, i.e., if the spade bit 400 is set and advertised as a $7/8"$ diameter spade bit, the third portion 436 has an outer diameter of $7/8"$. If desired, the side edges 412, 414 of the third portion 436 may be tapered at the same angle as the side edges 412, 414 of the second portion 433 are tapered.

This fourth embodiment of the spade bit 400 was designed because it has been found that in each of the first three embodiments of the spade bits 100, 200, 300, the grooves 128, 228a, 228b, 328 thereof all extend all the way to the cutting edges 120, 122; 220, 222; 320, 322 of the spade bits 100, 200, 300. It has been found that while the spade bits 100, 200, 300 work well with a professional 110 V AC electric drill, that many battery drills do not have enough torque to overcome the resistive torque produced when the full height of the grooves 128, 228a, 228b, 328 cut into the workpiece. It has been found that if the grooves 428 are stopped short of the cutting edges 420, 422 as in spade bit 400 by the addition of the first portion 432, the cutting edges 420, 422 are longer so that more of the workpiece, i.e., wood, is removed with the cutting edges 420, 422, and less of the workpiece is removed with the tearing action of the grooves 428.

Also, as each of the grooves 428 does not fully tear into the workpiece because of the first portion 432 and because of the tapering of the second portion 433, the roots of the grooves 428 are able to collect chips/sawdust from the workpiece without these chips/sawdust getting packed therein to slow down or prevent the pulling of the spade bit 400 through the hole of the workpiece. If the grooves 428 became packed with chips/sawdust, the grooves 428 may stop pulling the spade bit 400 through the hole of the workpiece.

It should be noted that current commercial spade bits are ground along both edges to the proper hole size and to provide relief and back clearance for a tool to which the spade bits 100, 200, 300, 400 are attached for drilling, but are not ground to provide grooves therein. All of the features of the spade bits 100, 200, 300, 400 can be ground in the same operation and should not represent a significant increase in cost over the current commercial process.

While preferred embodiments of the invention are shown and described, it is envisioned that those skilled in the art may devise various modifications without departing from the spirit and scope of the foregoing description and the appended claims.

The invention is claimed as follows:

1. A spade bit comprising:
   a blade portion having opposite first and second surfaces and a predetermined thickness of approximately between 0.085 and 0.095 inches, said predetermined thickness being defined by a distance between said first surface and said second surface, said blade portion further having opposite first and second side edges which extend from a front end of said blade portion to a rear end of said blade portion, at least a portion of said first and second side edges having grooves formed therein to define a grooved portion of said blade portion; and
   a shaft attached to said blade portion.

2. A spade bit as defined in claim 1, wherein said grooves formed in said first and second side edges of said grooved portion of said blade portion are straight grooves.

3. A spade bit as defined in claim 1, wherein said grooves of said grooved portion are formed at a lead angle of approximately between four and eight degrees.

4. A spade bit as defined in claim 3, wherein said grooves of said grooved portion are formed at a lead angle of approximately six degrees.

5. A spade bit as defined in claim 1, wherein said predetermined thickness of said blade portion is approximately 0.093 inches.

6. A spade bit as defined in claim 1, wherein said blade portion has a rear portion proximate to said rear end thereof, said rear portion being positioned between said grooved portion and said shaft, said first and second side edges of said blade portion at said rear portion thereof providing cutting edges.

7. A spade bit as defined in claim 6, wherein said rear portion has a diameter which is larger than a diameter of said grooved portion.

8. A spade bit as defined in claim 1, wherein said shaft is elongated and joined to said rear end of said blade portion.

9. A spade bit as defined in claim 1, further including a spur, said spur being provided at a front end of said blade portion.

10. A spade bit as defined in claim 9, wherein said spur is provided proximate said grooved portion.

11. A spade bit as defined in claim 1, wherein said first and second side edges of said grooved portion taper from a second end thereof to a first end thereof, said first end being proximate to said front end of said blade portion, said second end being proximate to said rear end of said blade portion.

12. A spade bit as defined in claim 11, wherein each of said grooves defines a pair of adjacent crests and a root between said adjacent crests, said grooved portion has a root diameter and a crest diameter proximate to said front end of said blade portion, said root diameter is defined as a distance between said root of said groove on said first side edge which is most proximate to said front end of said blade portion and said root of said groove on said second side edge which is most proximate to said front end of said blade portion, said crest diameter is defined as a distance between said crest of said groove on said first side edge which is most proximate to said front end of said blade portion and said crest of said groove on said second side edge which is most proximate to said front end of said blade portion, said blade portion has a front portion proximate to said front end thereof, said front portion being positioned between said front end and said grooved portion, said front portion having a predetermined diameter which is defined as a distance between said first side edge of said front portion and said second side edge of said front portion, said predetermined diameter of said front portion being equal to or greater than said root diameter, said predetermined diameter of said front portion being equal to or less than said crest diameter.

13. A spade bit as defined in claim 1, wherein said first and second side edges of said grooved portion are stepped to define a first grooved section and a second grooved section, said first grooved section being positioned between said front end of said blade portion and said second grooved section, said second grooved section being positioned between said first grooved section and said rear end of said blade portion.

14. A spade bit as defined in claim 13, wherein said first grooved portion has a predetermined diameter which is defined as a distance between said first and second side edges of said first grooved portion, and wherein said second grooved portion has a predetermined diameter which is defined as a distance between said first and second side edges of said second grooved portion, said predetermined diameter of said second grooved portion being larger than said predetermined diameter of said first grooved portion.

15. A spade bit as defined in claim 1, wherein said blade portion has a front leading edge at said front end thereof, said front leading edge is at least partially sharpened in order to act as a cutting edge of said blade portion.

16. A spade bit comprising:
   a shaft having a forward end and a rear end, said rear end of said shaft being configured to be received and held by a tool;

a spur having a forward end and a rear end, said forward end of said spur generally forming a point; and a blade portion having, a forward end and a rear end, said forward end of said blade portion being joined with said rear end of said spur, said rear end of said blade portion being joined with said forward end of said shaft, first and second spaced-apart surfaces, said first and second surfaces being generally parallel, said first and second surfaces being spaced apart by a predetermined thickness of approximately between 0.085 and 0.095 inches, first and second side edges which extend from said forward end of said blade portion to said rear end of said blade portion, and first and second portions, said first portion extending from said forward end of said blade portion to said second portion of said blade portion, said second portion extending from said first portion of said blade portion to said rear end of said blade portion, said first portion having grooves formed therein along said first and second side edges thereof, a distance from said first side edge to said second side edge of said first portion being less than a distance from said first side edge to said second side edge of said second portion.

17. A spade bit as defined in claim 16, wherein said grooves formed in said first and second side edges of said first portion of said blade portion are straight grooves which are formed at a lead angle of approximately between four and eight degrees.

18. A spade bit as defined in claim 16, wherein said first and second side edges of said second portion are formed as cutting edges.

19. A spade bit as defined in claim 16, wherein a cutting surface is provided between said spur and said blade portion.

20. A spade bit comprising:

a shaft having a forward end and a rear end, said rear end of said shaft being configured to be received and held by a tool;

a spur having a forward end and a rear end, said forward end of said spur generally forming a point; and a blade portion having, a forward end and a rear end, said forward end of said blade portion being joined with said rear end of said spur, said rear end of said blade portion being joined with said forward end of said shaft first and second spaced-apart surfaces, said first and second surfaces being generally parallel, said first and second surfaces being spaced apart by a predetermined thickness of approximately between 0.085 and 0.095 inches, first and second side edges which extend from said forward end of said blade portion to said rear end of said blade portion, and first and second portions, said first portion extending from said forward end of said blade portion to said second portion of said blade portion, said second portion extending from said first portion of said blade portion to said rear end of said blade portion, said first portion having grooves formed therein along said first and second side edges thereof, said first portion being stepped to define a first grooved section and a second grooved section, said first grooved section extending from said forward end of said blade portion to said second grooved section, said second grooved section extending from said first grooved section to said second portion of said blade portion, a distance from said first side edge to said second side edge of said first grooved section being less than a distance from said first side edge to said second side edge of said second grooved section, a distance from said first side edge to said second side edge of said second grooved section being less than a distance from said first side edge to said second side edge of said second portion.

21. A spade bit as defined in claim 20, wherein said grooves formed in said first and second side edges of said first portion are straight grooves which are formed at a lead angle of approximately between four and eight degrees.

22. A spade bit as defined in claim 20, wherein said first and second side edges of said second portion are formed as cutting edges.

23. A spade bit as defined in claim 20, wherein a cutting surface is provided between said spur and said blade portion.

24. A spade bit comprising:

a shaft having a forward end and a rear end, said rear end of said shaft being configured to be received and held by a tool;

a spur having a forward end and a rear end, said forward end of said spur generally forming a point; and a blade portion having, a forward end and a rear end, said forward end of said blade portion being joined with said rear end of said spur, said rear end of said blade portion being joined with said forward end of said shaft, first and second spaced-apart surfaces, said first and second surfaces being generally parallel, said first and second surfaces being spaced apart by a predetermined thickness of approximately between 0.085 and 0.095 inches, first and second side edges which extend from said forward end of said blade portion to said rear end of said blade portion, and first and second portions, said first portion extending from said forward end of said blade portion to said second portion of said blade portion, said second portion extending from said first portion of said blade portion to said rear end of said blade portion, said first portion having grooves formed therein along said first and second side edges thereof, said first portion being tapered such that a distance from said first side edge to said second side edge of said first portion proximate to said forward end of said blade portion is less than a distance from said first side edge to said second side edge of said first portion proximate to said second portion, a distance from said first side edge to said second side edge of said first portion proximate to said second portion being less than a distance from said first side edge to said second side edge of said second portion, and said second portion not having grooves formed therein along said first and second side edges thereof.

25. A spade bit as defined in claim 24, wherein said grooves formed in said first and second side edges of said first portion are straight grooves which are formed at a lead angle of approximately between four and eight degrees.

26. A spade bit as defined in claim 24, wherein said first and second side edges of said second portion are formed as cutting edges.

27. A spade bit as defined in claim 24, wherein a cutting surface is provided between said spur and said blade portion.

28. A spade bit comprising:

a shaft having a forward end and a rear end, said rear end of said shaft being configured to be received and held by a tool;

a spur having a forward end and a rear end, said forward end of said spur generally forming a point; and a blade portion having,
- a forward end and a rear end, said forward end of said blade portion being joined with said rear end of said spur, said rear end of said blade portion being joined with said forward end of said shaft,
- first and second spaced-apart surfaces, said first and second surfaces being generally parallel, said first and second surfaces being spaced apart by a predetermined thickness of approximately between 0.085 and 0.095 inches,
- first and second side edges which extend from said forward end of said blade portion to said rear end of said blade portion, and
- first, second and third portions, said first portion extending from said forward end of said blade portion to said second portion of said blade portion, said second portion extending from said first portion of said blade portion to said third portion of said blade portion, said third portion of said blade portion extending from said second portion of said blade portion to said rear end of said blade portion, said second portion having grooves formed therein along said first and second side edges thereof, each of said grooves defining a pair of adjacent crests and a root therebetween, said first side edge of said first portion being positioned between said crest and said root of the groove of said second portion along said first side edge thereof which is most proximate to said first portion, said second side edge of said first portion being positioned between said crest and said root of the groove of said second portion along said second side edge thereof which is most proximate to said first portion, said second portion being tapered such that a distance from said first side edge to said second side edge of said second portion proximate to said first portion of said blade portion is less than a distance from said first side edge to said second side edge of said second portion proximate to said third portion, a distance from said first side edge to said second side edge of said second portion proximate to said third portion being less than a distance from said first side edge to said second side edge of said third portion.

29. A spade bit as defined in claim 28, wherein said grooves formed in said first and second side edges of said second portion are straight grooves which are formed at a lead angle of approximately between four and eight degrees.

30. A spade bit as defined in claim 28, wherein said first and second side edges of said third portion are formed as cutting edges.

31. A spade bit as defined in claim 28, wherein a cutting surface is provided between said spur and said blade portion.

32. A spade bit comprising:

a blade portion having,
- opposite first and second surfaces defining a predetermined thickness of approximately between 0.085 and 0.095 inches,
- means for cutting a hole through a workpiece, said cutting means including a spur, and
- means for pulling said blade portion through the hole of the workpiece said pulling means not being provided on said spur.

33. A spade bit as defined in claim 6, wherein said rear portion does not have grooves formed therein along said first and second side edges.

34. A spade bit as defined in claim 16, wherein said second portion does not have grooves formed therein along said first and second side edges.

35. A spade bit as defined in claim 20, wherein said second portion does not have grooves formed therein along said first and second side edges.

36. A spade bit as defined in claim 28, wherein said first portion does not have grooves formed therein along said first and second side edges.

37. A spade bit as defined in claim 28, wherein said third portion does not have grooves formed therein along said first and second side edges.

* * * * *